(12) United States Patent
Thompson et al.

(10) Patent No.: US 12,146,302 B2
(45) Date of Patent: Nov. 19, 2024

(54) RESIDENTIAL GREY WATER RECYCLING SYSTEM

(71) Applicant: Greyter Water Systems Inc., Toronto (CA)

(72) Inventors: Christopher Roy Thompson, Barrie (CA); Michael Nelson Pereira Caldeira, Toronto (CA); Babak Lakghomi, Toronto (CA)

(73) Assignee: Greyter Water Systems Inc., Toronto (CA)

( * ) Notice: Subject to any disclaimer, the term of this patent is extended or adjusted under 35 U.S.C. 154(b) by 343 days.

(21) Appl. No.: 16/078,246

(22) PCT Filed: Mar. 2, 2017

(86) PCT No.: PCT/CA2017/050282
§ 371 (c)(1),
(2) Date: Aug. 21, 2018

(87) PCT Pub. No.: WO2017/147710
PCT Pub. Date: Aug. 9, 2017

(65) Prior Publication Data
US 2019/0047878 A1 Feb. 14, 2019

Related U.S. Application Data

(60) Provisional application No. 62/302,988, filed on Mar. 3, 2016, provisional application No. 62/305,625, filed on Mar. 9, 2016.

(51) Int. Cl.
*E03B 1/04* (2006.01)
*B01D 29/66* (2006.01)
(Continued)

(52) U.S. Cl.
CPC ............ *E03B 1/042* (2013.01); *B01D 29/668* (2013.01); *B01D 35/143* (2013.01);
(Continued)

(58) Field of Classification Search
CPC .. B01D 29/668; B01D 35/143; B01D 35/147; E03B 1/041; E03B 1/042;
(Continued)

(56) References Cited

U.S. PATENT DOCUMENTS 3,928,197 A * 12/1975 Horan, Jr. ................. C02F 1/76
210/741
4,019,983 A * 4/1977 Mandt ............... B01F 25/31233
210/220
(Continued)

FOREIGN PATENT DOCUMENTS

BE 1019195 A4 4/2012
CA 2626171 A1 9/2009
(Continued)

OTHER PUBLICATIONS

European Patent Application No. 17759049.4, Office Action dated Jan. 26, 2021.
(Continued)

*Primary Examiner* — Terry K Cecil
(74) *Attorney, Agent, or Firm* — BORDEN LADNER GERVAIS LLP

(57) ABSTRACT

This specification describes systems for the treatment and reuse of grey water and related processes. An exemplary system collects grey water from baths and showers and treats it for use in toilet flushing. Influent bathing water passes through a prefilter to remove larger particles and flows into a grey water collection tank. Collected grey water is filtered through a membrane designed to remove suspended solids. Membrane permeate passes through a sorbent
(Continued)

media to remove soluble organics and then flows into a permeate tank. A chemical agent is used to disinfect water in one or more parts of the system and optionally to clean the membranes. A control system manages the operation of system. The system operates in a generally daily cycle with permeation dispersed over a material time, for example 4 or 8 hours or more.

10 Claims, 3 Drawing Sheets

(51) Int. Cl.
    B01D 35/143 (2006.01)
    B01D 35/147 (2006.01)
    C02F 1/00 (2023.01)
    C02F 1/28 (2023.01)
    C02F 1/44 (2023.01)
    C02F 1/68 (2023.01)
    C02F 1/76 (2023.01)
    C02F 103/00 (2006.01)
    E03C 1/26 (2006.01)
    E03D 5/00 (2006.01)

(52) U.S. Cl.
    CPC ............ B01D 35/147 (2013.01); C02F 1/001 (2013.01); C02F 1/008 (2013.01); C02F 1/283 (2013.01); C02F 1/44 (2013.01); C02F 1/686 (2013.01); C02F 1/76 (2013.01); E03B 1/041 (2013.01); E03D 5/003 (2013.01); C02F 2103/002 (2013.01); C02F 2209/03 (2013.01); C02F 2209/40 (2013.01); C02F 2209/42 (2013.01); C02F 2303/16 (2013.01); E03B 2001/045 (2013.01); E03C 1/26 (2013.01); Y02A 20/148 (2018.01); Y02A 20/30 (2018.01)

(58) Field of Classification Search
    CPC ..... E03B 2001/045; E03C 1/26; E03D 5/003; Y02A 20/148; Y02A 20/30; C02F 1/001; C02F 1/008; C02F 1/283; C02F 1/44; C02F 1/686; C02F 1/76; C02F 2103/002; C02F 2209/03; C02F 2209/40; C02F 2209/42; C02F 2303/16
    See application file for complete search history.

(56) References Cited

U.S. PATENT DOCUMENTS

| | | | |
|---|---|---|---|
| 5,066,393 A | 11/1991 | Padera et al. | |
| 5,106,493 A | 4/1992 | McIntosh | |
| 5,578,213 A | 11/1996 | Miller et al. | |
| 5,885,459 A | 3/1999 | Lerche et al. | |
| 6,331,251 B1 | 12/2001 | Del et al. | |
| 8,377,291 B2 | 2/2013 | Eckman | |
| 8,834,716 B2* | 9/2014 | Parkinson | C02F 1/38 210/512.1 |
| 10,214,880 B2* | 2/2019 | Robb | E03B 1/042 |
| 10,675,570 B2* | 6/2020 | Wolff | B01D 65/02 |
| 10,934,691 B2 | 3/2021 | Thompson et al. | |
| 2003/0111412 A1 | 6/2003 | Jeong et al. | |
| 2004/0007525 A1* | 1/2004 | Rabie | B01D 65/08 210/636 |
| 2006/0060512 A1 | 3/2006 | Astle et al. | |
| 2007/0068879 A1 | 3/2007 | Markle et al. | |
| 2008/0173581 A1 | 7/2008 | Maclean | |
| 2010/0125938 A1 | 5/2010 | Billon | |
| 2010/0237021 A1 | 9/2010 | Guttau et al. | |
| 2010/0243580 A1 | 9/2010 | Lobban | |
| 2011/0094963 A1* | 4/2011 | Tada | C02F 1/44 210/636 |
| 2011/0278222 A1* | 11/2011 | Ikuno | C02F 3/1226 210/198.1 |
| 2012/0067826 A1 | 3/2012 | White | |
| 2013/0126433 A1* | 5/2013 | Wolff | C02F 1/444 210/650 |
| 2013/0153493 A1 | 6/2013 | Young et al. | |
| 2014/0021112 A1 | 1/2014 | Boodaghians et al. | |
| 2014/0027360 A1* | 1/2014 | Lee | B01D 61/18 210/99 |
| 2015/0191365 A1 | 7/2015 | Robb et al. | |
| 2016/0053425 A1 | 2/2016 | Wolff | |

FOREIGN PATENT DOCUMENTS

| | | | | |
|---|---|---|---|---|
| DE | 202009003118 U1 | 6/2009 | | |
| WO | 9730233 A1 | 8/1997 | | |
| WO | 2007103234 A2 | 9/2007 | | |
| WO | 2009022143 A1 | 2/2009 | | |
| WO | 2010096877 A1 | 9/2010 | | |
| WO | WO-2012123887 A1 * | 9/2012 | ............ | E03B 1/041 |
| WO | 2013181747 A1 | 12/2013 | | |

OTHER PUBLICATIONS

U.S. Appl. No. 16/078,250, Notice of Allowance dated Jan. 14, 2021.
European Patent Application No. 17759049.4, Office Action dated Sep. 24, 2019.
European Patent Application No. 17759049.4, Supplementary European Search Report dated Sep. 6, 2019.
European Patent Application No. 17759050.2, Partial Supplementary European Search Report dated Dec. 13, 2019.
European Patent Application No. 17759050.2, Extended European Search Report dated Mar. 27, 2020.
Fravel et al., "Dynamic Improvements in Low Pressure Membranes and System Design," Water Online, Jan. 20, 2016, 6 pages. XP055575956. Retrieved from the Internet:[https://www.wateronline.com/doc/dynamic-improvements-in-low-pressure-membranes-and-system-design-0001].
International Patent Application No. PCT/CA2017/050282, International Preliminary Report on Patentability dated Sep. 4, 2018.
International Patent Application No. PCT/CA2017/050282, International Search Report and Written Opinion dated May 19, 2017.
International Patent Application No. PCT/CA2017/050283, International Preliminary Report on Patentability dated Sep. 4, 2018.
International Patent Application No. PCT/CA2017/050283, International Search Report and Written Opinion dated May 16, 2017.
Scheumann et al., "Influence of Hydraulic Retention Time on the Operation of a Submerged Membrane Sequencing Batch Reactor (SM-SBR) for the Treatment of Greywater," Desalination, vol. 246 (1-3), Sep. 2009, pp. 444-451, [retrieved on Aug. 12, 2009] XP026458452.
U.S. Appl. No. 16/078,250, Non-Final Office Action dated Oct. 1, 2019.
U.S. Appl. No. 16/078,250, Advisory Office Action dated Jun. 4, 2020.
U.S. Appl. No. 16/078,250, Advisory Office Action dated Jun. 30, 2020.
U.S. Appl. No. 16/078,250, Final Office Action dated Mar. 26, 2020.
U.S. Appl. No. 16/078,250, Office Action dated Aug. 4, 2020.
European Patent Application No. 17759050.2 , Communication pursuant to Article 94(3) EPC dated Apr. 30, 2021.
European Patent Application No. 17759049.4, Office Action dated Oct. 25, 2021.
U.S. Appl. No. 17/585,127, Non Final office Action dated Jan. 23, 2023.
English Translation of BE1019195A4 for espacenet.com (Year: 2012).
U.S. Appl. No. 17/162,684, Final office Action dated May 19, 2023.
U.S. Appl. No. 17/585,127, Final office action dated Jul. 17, 2023.
Canadian Patent Application No. 3,015,230, Office Action dated Dec. 1, 2022.

(56) References Cited

OTHER PUBLICATIONS

Canadian Patent Application No. 3,015,264, Office Action dated Dec. 5, 2022.
U.S. Appl. No. 17/162,684 Non-Final Office Action dated Dec. 8, 2022.
Canadian Patent Application No. 3015230, Office Action dated Mar. 25, 2024.
U.S. Appl. No. 17/585,127, Final Office Action dated May 28, 2024.
U.S. Appl. No. 17/585,127, Final Office Action dated Aug. 21, 2024.

* cited by examiner

RESIDENTIAL GREY WATER RECYCLING SYSTEM

RELATED APPLICATIONS

This application is a National Stage Entry of International Application No. PCT/CA2017/050282, filed Mar. 2, 2017, which claims priority from U.S. provisional patent application 62/302,988 filed on Mar. 3, 2016 and U.S. provisional patent application 62/305,625 filed on Mar. 9, 2016, both of which are incorporated herein by reference.

FIELD

This specification relates to grey water recycling.

BACKGROUND

U.S. Pat. No. 8,377,291 describes a water recycling system that can be used for reclaiming and recycling grey water to provide water for landscaping or sanitary facilities such as a toilet. The water recycling system includes a tank, an influx pipe with a filter screen, and a pump. The filter screen covers an opening in the bottom of the influx pipe. The part of the influx pipe containing the filter screen is sloped. At least some influent water passing through the influx pipe falls through the filter screen to be collected in the tank. Any excess influent water continues past the filter screen and flows through the influx pipe to an external sanitary drain. When filtered water is drawn from the tank for use, a portion of it is sprayed against the bottom of the screen to force material off the filter screen and into the influx pipe.

NSF/ANSI Standard 350 establishes effluent quality criteria for, among other things, onsite residential (single residence, up to 1,500 gallons (5700 L) per day) grey water treatment systems used to provide non-potable (i.e. toilet flushing) water. The influent test water has a TSS of 80-160 mg/L and $CBOD_5$ of 130-180 mg/L, among other parameters. The effluent requirements include TSS of 10 mg/L or less and $CBOD_5$ of 10 mg/L or less. The required BOD reduction is a difficult challenge, in part because the synthetic challenge water used for the test includes organics from shampoo, hair conditioner and soap as well as suspended solids and a small amount of residential wastewater.

INTRODUCTION

This specification describes a grey water collection and recycling system and process. The system and process are useful, for example, in collecting grey water from baths or showers or both (bathing water) for re-use in toilet flushing in a single-family residence. The following paragraphs describe various features of the system and process. However, a claimed invention may involve only a subset of the features in this summary, or a subset of features in this summary combined with one or more features in the detailed description to follow.

In a typical day, a household generates an excess of bathing water in the morning but uses a similar volume of water for toilet flushing throughout the day. The system described herein has two holding tanks to, at least in part, separate in time the collection of bathing water from the provision of toilet flushing water. This allows a relatively small membrane filtration unit to operate at low flux while still operating in a cycle of about 24 hours (i.e. up to 27 hours) or less. For example, the membrane unit may process grey water at a rate of 10-80 L/hr. However, the total volume of both tanks may be 500 L or less, preferably 400 L or less. The entire system can be provided in an integrated appliance sized package, preferably a packaged unit that is no more than two feet (610 mm) wide and no more than six feet (1830 mm) high. One exemplary system tested met NSF 350 standards for suspended solids and BOD removal.

In a process, influent bathing water is collected, optionally pre-filtered, and stored in a collection tank. Collected influent water is filtered through a membrane unit. The membrane filtration is not instantaneous, but the typical daily volume of bathing water generated in a single-family residence (for example 240 L or more, optionally 325 L, or more) is filtered through the membrane unit in about 24 hours (i.e. up to 27 hours) or less. The membrane permeate is stored in a permeate tank for delivery on demand for toilet flushing. Optionally, permeate is also treated with a sorbent and disinfected, i.e. oxidized.

A system described in this specification has an optional prefilter, a greywater collection tank, a microfiltration or ultrafiltration membrane, a sorbent media column, a permeate tank, a chemical dosing system and a control system. Optionally, the prefilter has an automated backwash cycle. Optionally, the membrane is located in the bottom of the collection tank, which may have a reduced cross section in an area surrounding the membrane unit. Optionally, the chemical dosing system may communicate with the permeate tank or the collection tank or both.

DETAILED DESCRIPTION

Figure 1:
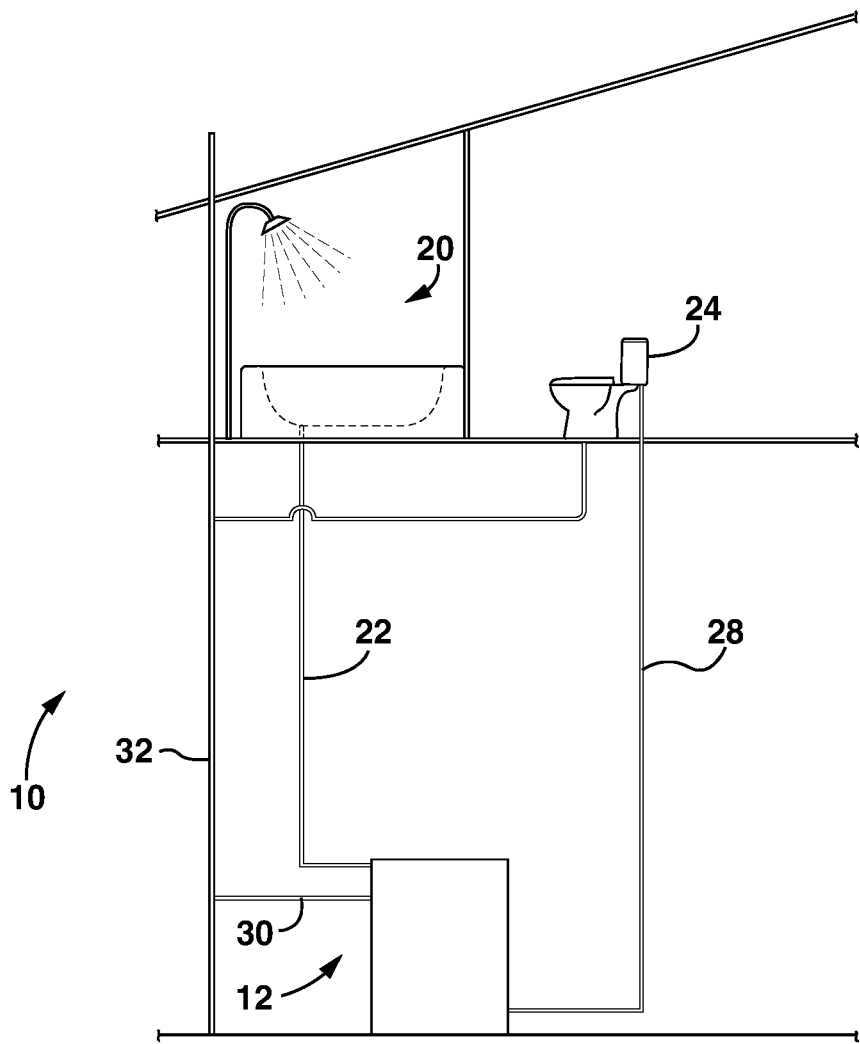
FIG. 1 is a schematic overview of a grey water recycling system in a house.

FIG. 1 shows a house 10 with a grey water recycling system 12. Grey water collected from a bathtub or shower 20 flows down grey water drain 22 to the grey water recycling system 12. The grey water recycling system 12 delivers treated water under pressure to a toilet 24 through a pressurized supply line 28. A waste drain line 30 connects the grey water system to a sanitary drain stack 32. Sanitary drain stack 32 is connected to a sewer, septic system or other wastewater treatment system in or outside of the house 10.

Figure 2:
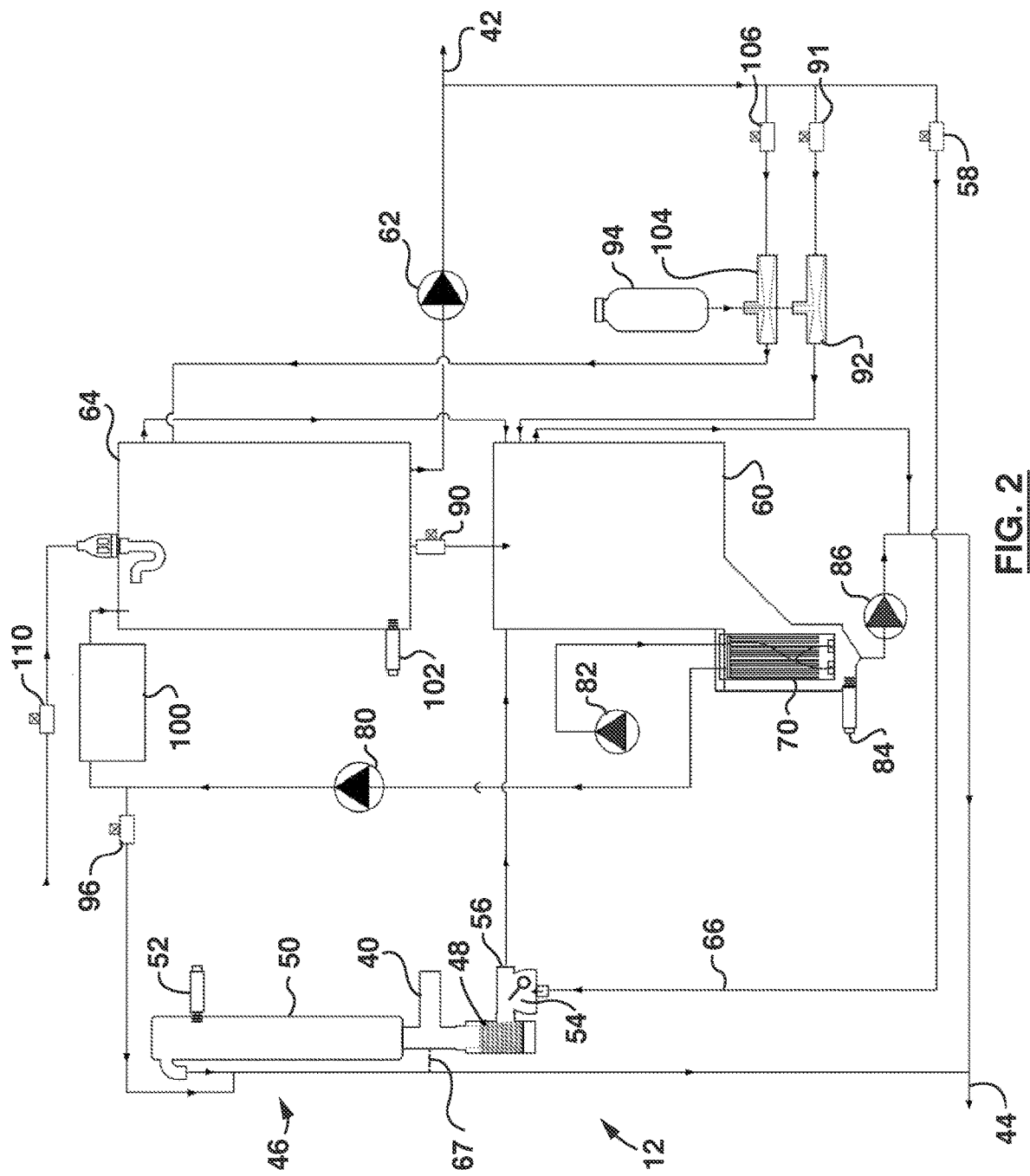
FIG. 2 is a schematic drawing showing an example of a grey water recycling system.

FIG. 2 shows an example of a grey water recycling system 12. When installed, grey water inlet 40 is connected to the grey water drain 22 of the house 10. Treated water outlet 42 is connected to pressurized supply line 28. Waste outlet 44 is connected to waste drain line 30.

As mentioned above, reclaimed bathing water from showers and baths enters the grey water recycling system 12 through a grey water inlet 40. Influent grey water passes through a pre-filter unit 46. The pre-filter unit 46 has a filter screen 48, which separates solids such as hair, soap pieces and other debris from the grey water. An integrated bypass tank 50 is connected to the grey water inlet and provides a volume in communication with and above the filter screen 48. If the filter screen 48 begins to clog, the bypass tank 50 will temporarily retain a volume of grey water. The bypass tank 50 thereby acts as a buffer to allow more time for the incoming grey water to pass through the filter screen 48. If the filter screen 48 becomes significantly clogged, grey water rises up to the top of the bypass tank 50 and may overflow to the waste outlet 44. As, or shortly before, the grey water overflows to the waste outlet 44, a water proximity sensor 52 sends a signal indicating that influent grey water is near the top of the bypass tank 50. After receiving the signal, the controller implements a filter screen 48 cleaning process. The controller is not shown in FIG. 2 to simplify the figure. However, the controller is connected to all of the sensors and controlled devices (i.e. pumps and valves) of the grey water recycling system 12 as well as to an operator interface.

Under normal operation, a flapper valve 54 is open. This allows incoming grey water to flow through the filter screen 48 and flow out of a pre-filtered outlet 56 of the pre-filter unit 46 to a grey water collection tank 60. When water is detected at the water proximity sensor 52, the controller waits for a predetermined period of time, for example 5 or 10 minutes, and then opens a backwash valve 58, (i.e. a solenoid valve). Backwash valve 58 is connected to the outlet of a main pump 62. Main pump 62 draws treated water from a permeate tank 64. Main pump 62 has an integrated pressure sensor on its outlet. Main pump 62 turns on whenever the outlet pressure drops below a preselected minimum, for example 30 psi, and turns off whenever outlet pressure exceeds a preselected maximum, for example 50 psi. Opening backwash valve 58 thereby causes a flow of pressurized water in backwash line 66. The pressurized water impinges against flapper valve 54 and causes flapper valve 54 to cover the pre-filtered outlet 56. Water then flows in a reverse direction through the filter screen 48 and overflows through the by-pass tank 50 to the waste outlet 44. Solids attached to the filter screen 48 are thereby removed from the pre-filter unit 46. After a predetermined time, the controller closes the backwash valve 58 to end the cleaning process. Optionally, a backwash waste connector 67 can be opened during the cleaning process to allow backwash water to flow to the waste outlet 44 without passing through the by-pass tank 50. Optionally, an air pump (for example air pump 82 described below) can be turned on and used to add air to the flow of pressurized water in backwash line 66. Optionally, the pre-filter unit 46 may be as described in U.S. provisional application 62/302,988 filed on Mar. 3, 2016, entitled Intake Filter for Water Collection System with Pressure Activated Backwash Valve, or a PCT application claiming priority to that application filed on the same date as the present application, both of which are incorporated herein by reference.

The pre-filtered water is stored temporarily in the collection tank 60. The grey water recycling system 12 may be designed for a typical single-family residence, for example with up to five inhabitants. Although water use varies, one frequent pattern is for bathing to peak in the morning, sometimes with a minor amount of bathing in the evening. Toilet flushing also has a morning peak, but is typically more evenly dispersed throughout the day compared to bathing. The permeate tank 64 is sized to hold at least enough treated water for a morning toilet flushing peak. The collection tank 60 is sized to hold the water generated during a morning bathing peak. This holding volume of the collection tank 60 is provided to reduce stress on a membrane unit 70 by allowing the membrane unit 70 at least a few hours, for example 3-8 hours or more, to process enough water to re-fill the permeate tank 64. In this way, the membrane unit 70 operates at a lower flux, which reduces fouling.

The membrane unit 70 may have, for example, ultrafiltration or microfiltration membranes. The membrane unit may be located in its own tank or immersed in the collection tank 60, preferably on or near the bottom of the collection tank 60. The collection tank 60 shown is shaped with a reduced horizontal cross sectional area around the membrane unit 70. This reduces a minimum holding volume required to ensure that the membranes are submerged in water at most times, or at least while permeating an otherwise frequently enough to avoid drying the membranes out.

Figure 3C:
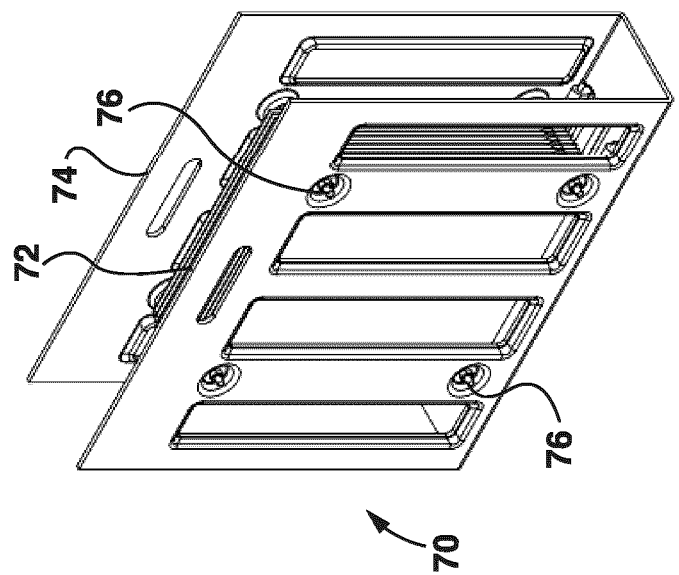
FIGS. 3A, 3B and 3C are front, side and isometric views of a membrane unit of the grey water recycling system of FIG. 2.
Figure 3B:
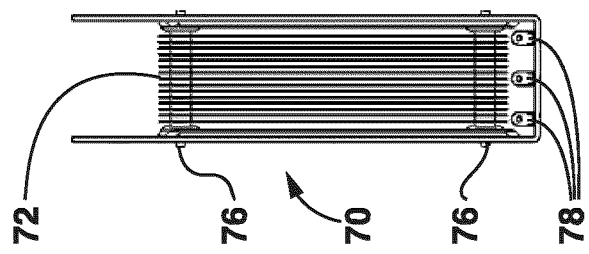
Figure 3A:
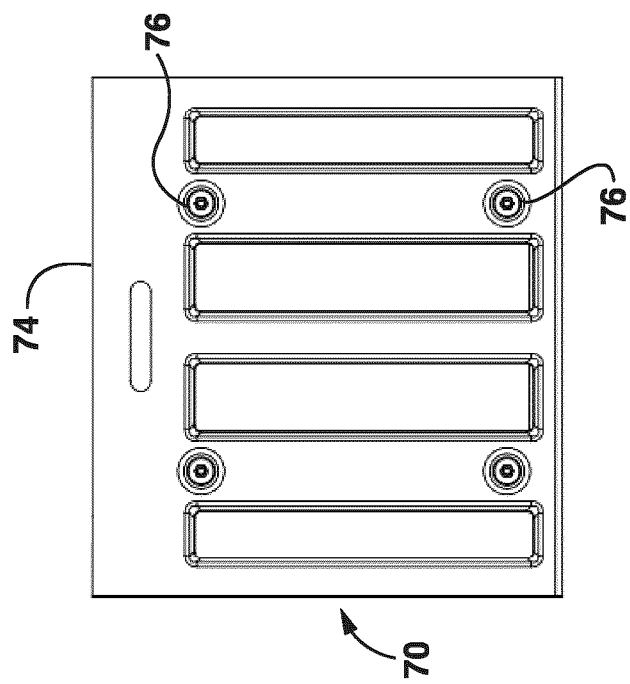

FIGS. 3A, 3B and 3C show an example of a membrane unit 70. In this example, several flat sheet membranes 72 are oriented vertically in a membrane housing 74. Permeate collectors 76 separate the individual membranes 72, connect them to the membrane housing 74, and provide ports in communication with the inside of the membranes 72 for permeate removal. Aerators 78 are attached to the membrane housing 74 below the membranes 72 for use in cleaning the membranes 72. Optionally, the membranes may be made of polyvinylidene fluoride (PVDF) for chlorine resistance.

Referring back to FIG. 2, filtered water (permeate) is drawn through the membrane unit 70 by suction from a membrane pump 80, for example a peristaltic pump. Flux through the membranes may be in the range of 1-5 gfd (1.7-8.5 L/m2/hour). The membrane unit 70 can be cleaned physically periodically by one or more of relaxation, backwashing and bubble scouring. Preferably, relaxation or backwashing and bubble scouring are conducted simultaneously or at least overlapping in time, or with the bubble scouring directly follows backwashing. To provide relaxation, the membrane pump 80 is stopped. To provide backwashing, the membrane pump 80 can be reversed. Alternatively, backwashing can be provided by opening a valve, for example a solenoid valve, in a conduit connecting the outlet of the main pump 62 to the outlet of the membrane unit 70, which backwashes membrane unit 70 with fully treated water. Backwashing may be provided, for example, for 5-120 seconds every 15 to 240 minutes. To provide bubble scouring, the air pump 82 is turned on to deliver air to the aerators 78. Bubbles from the aerators 78 circulate grey water through the membrane unit 70 and scour the membranes 72. The bubbles may also break up a concentration polarization layer on the membranes 72.

A pressure sensor 84 at the bottom of collection tank 60 allows the controller to calculate the volume of water in the collection tank 60. The pressure sensor 84 also detects the addition of any new incoming water. A typical shower produces about 65 L of water. In a typical single-family residence, there are often three or more showers in a morning. The collection tank 60 is sized to hold at least a significant portion of morning shower water for processing later. For example, the collection tank 60 may have a volume of 150 L or more.

A purge pump 86 is installed at the bottom of the collection tank 60. As permeate is removed from the collection tank 60, water in the collection tank becomes concentrated. The collection tank 60 is purged from time to time to avoid over-concentrating the waster in the collection tank 60. The controller may determine that over-concentration has occurred, or is likely to occur, based on the cumulative amount of grey water collected since the last purge. When a new purge is indicated, the controller waits for a new input of grey water to be detected entering the collection tank 60, as indicated by an increase in pressure (and therefore the tank water level) detected by the pressure sensor 84. The controller then causes the purge pump 86 to pump water from the collection tank 60 to the waste outlet 44. The purge pump 86 may remove a predetermined volume of water or reduce the pressure (water level) in the collection tank to a predetermined amount. Purging water from the collection tank 60 prevents operation of the membrane unit 70 in overly concentrated greywater and thereby reduces fouling.

If no new grey water has entered the collection tank 60 for more than 48 hours, the controller turns on the purge pump 60 and empties the collection tank 60. Then, the transfer solenoid 90 opens to add the minimum volume of water required to submerge the membrane unit 70 within the collection tank 60, for example 20 L.

When new water is entering the collection tank 60, or water has remained stagnant in the collection tank 60 for more than 6 hours, the controller opens a collection tank chlorination valve 91 (i.e. a solenoid valve). Pressurized water delivered from the main pump 62 flows through a collection tank venturi 92. Reduced pressure in the collection tank venturi 92 draws chlorine (i.e. liquid laundry bleach) from a chlorine tank 94. The chlorine tank 94 is located below the collection tank venturi 92. The chlorine mixes with the flowing water and chlorine is transferred from the chlorine tank 94 to the collection tank 60. Alternatively, a dedicated chlorine pump can transfer chlorine from chlorine tank 94 to the collection tank 60 directly or indirectly. To provide an indirect transfer, chlorine can first be pumped from chlorine tank 94 and through a T-connection that is located in a line downstream of main pump 62, optionally replacing collection tank venturi 92. Following that step, the chlorination valve 91 is opened, which causes pressurized water from the main pump 62 to carry chlorine that was pumped through the T-connection to the collection tank 60. Adding chlorine to the collection tank 60 reduces the risk of biofilm formation in the collection tank 60 and on the surfaces of the membranes 72.

Periodically, for example once every 4 to 8 days, the collection tank 60 is hyper-chlorinated to clean the membrane unit 70. A hyper-chlorination cycle is preferably started when the water level in the collection tank 60 is low, for example than 40 L or less. The controller stops the permeate pump 80 and turns on the purge pump 86 to reduce the volume of water in the collection tank 60 to the minimum required to submerge the membrane unit 70, for example 20 L. The controller then transfers sufficient chlorine to the collection tank 60 (using any method described above) to bring the chlorine concentration in the collection tank to 200 ppm or more, for example 300 ppm. The membrane unit 70 is soaked in the concentrated chlorine solution. The membrane pump 80 is then activated to draw chlorinated water through the membrane unit 70. Permeate produced during this time is directed to the waste outlet 44 by opening a waste permeate valve 96 (i.e. a solenoid valve). In an alternative method of hyper-chlorination, chlorine is transferred to the collection tank 60 and backwashed through the membrane unit 70 simultaneously, or partially simultaneously or sequentially. First, chlorine is injected into a line or manifold downstream of the main pump 62. Thereafter, opening a valve in a conduit connecting the outlet of the main pump 62 downstream of the chlorine injection to the outlet of the membrane unit 70 backwashes membrane unit 70. Opening chlorination valve 90 provides an indirect transfer of chlorine to collection tank 60 as described above. After cleaning the membrane unit 70 with the concentrated chlorine solution, the purge pump 86 is turned on to empty the collection tank 60. A transfer solenoid 90 is then opened to add enough water to the collection tank 60 to keep the membrane unit 70 submerged. Membrane pump 80 is then activated, optionally with the permeate valve 96 open, to flush water through the membrane unit 70 and permeate tubing. The permeate valve 96 is then closed if it was open and the grey water system 12 resumes the normal processing of incoming water. Particularly in the hyper-chlorination method in which the membrane unit 70 is backwashed rather than permeating, the permeate valve 96 may be deleted. In this case, after the membrane unit 70 is soaked in chlorine solution for the required period of time and the collection tank 60 is purged, the membrane pump 80 can be re-activated. A small amount of chlorinated water will be pumped into the next stage (adsorption unit 100 discussed below).

The permeate flows from the permeate pump 80 to an adsorption unit 100. Optionally, the adsorption unit 100 may have multiple adsorption columns in series. The adsorption columns may be U-shaped or otherwise configured to provide more contact time in a compact area. In an example, the surface loading in an adsorption column is 0.66 m/hr, and the total empty bed contact time is 156 min. Dissolved surfactants and other organics are adsorbed into the adsorbing media of the adsorption unit 100, for example activated carbon. Optionally, or if necessary, a vent with a valve such as a solenoid valve operable by the controller can be used to vent air from the adsorption unit. Air can be vented on a predetermined schedule, for example once every 15 to 120 minutes.

Treated water is collected in the permeate tank 64 after passing through the adsorption unit 100. When there is demand for water after a toilet 24 flushes, the main pump 62 senses reduced pressure at its outlet and turns on to send water from permeate tank 64 to the toilet 24. A second pressure sensor 102 reads the water level in the permeate tank 64. The permeate pump 80 turns on to deliver more water to the permeate tank 64 whenever the permeate tank 64 is below full capacity the water level in the collection tank 60 is above the membrane unit 70.

A permeation tank chlorination valve 106 (i.e. a solenoid valve) is opened periodically, for example once every 1-4 hours. This causes main pump 62 to circulate water from permeate tank 64, through a permeate tank venturi 104, and back to permeate tank 64. Water flowing in permeate tank venturi 104 draws chlorine from chlorine tank 94. Alternatively, a chlorine pump can be used to pump chorine from chlorine tank 94 into permeate tank 64 directly, or indirectly through a T-fitting replacing permeate tank 104 followed by opening permeation tank chlorination valve 106. Chlorine is thereby transferred from chlorine tank 94 to permeate tank 64 to disinfect the water in the permeate tank 64. The amount of chlorine added to the permeate tank 64 is determined by the controller considering, for example, the volume of new and stagnant water in the permeate tank 64.

A typical toilet uses 6-13 L per flush. The permeate tank 64 is preferably sized to hold enough water for a morning peak, for example 4 or more flushes. For example, the permeate tank 64 may have a volume of 25 L. However, a larger volume, for example 50 L or more, is preferable to reduce the chance of emptying the permeate tank 64. Further, permeate tank volume in excess of that required for a morning peak, for example 80 L or more, allows the membrane unit 70 to operate for a longer period of time overnight, which in turn reduces the required flux or membrane area.

If the water level in the permeate tank 64 is less than a predetermined minimum, for example 10% of the permeate tank 64 volume or 8 L, a make up water valve 110 (i.e. a solenoid valve) opens. The make up water valve 110 is connected to a fresh water supply (not shown) for example a supply of municipal drinking water to the house 10. The make up water valve 110 is kept open until enough fresh water is added to bring the water level in the permeate tank back to a predetermined amount, for example 25% of the permeate tank 64 volume or 15 L. As discussed previously, the transfer valve 90 may open from time to time, for example to add water to submerge the membrane unit 70 after the collection tank 60 is purged after a membrane cleaning (hyper-chlorination) cycle. In some cases, this may cause the make up valve 110 to open and some make up water may flow into the collection tank 60.

In the example shown in FIG. 2, a control system includes a controller (not shown), pressure sensors 84, 102 in the permeate and collection tanks, optionally one or more leak detection sensors, a plurality of solenoid valves such as 106, 58, 90, 110, and optionally 96 that can be opened/closed by the controller and pumps (main pump 62, membrane pump 80, purge pump 86, air pump 82 and optionally a chlorine pump) that can be turned on and off by the controller. The controller is programmed to perform various calculations. For example, the controller can calculate the volume of water in each tank 60, 64. The controller activates and ends chlorination, purging, and hyperchlorination (membrane cleaning) processes, optionally considering the volume of water in a tank 60, 64 and time passed from the previous cycle. The controller can detect clogging of the pre-filter and activate and end a process to clean the pre-filter. Optionally, the controller can also detect failures in the system (for example failures of a valve or a pump) and inform the homeowner to seek service.

EXAMPLE

The effectiveness of a prototype grey water recycling system 12 as shown in FIG. 2 in meeting NSF 350 requirements was evaluated. The prototype included a submerged ultrafiltration membrane and a carbon adsorption column. included 10 flat sheet membranes with a combined surface area of 13 ft$^2$ (1.2 m$^2$). The sheets were made of PVDF membrane coated on a non-woven substrate. The membranes had a molecular weight cut-off (MWCO) of 75 kDa. The membrane unit was operated at a flux of 3 gfd (5 L/m$^2$/hour) and was immersed in the collection tank. A peristaltic pump (MasterFlex L/S, Cole Parmer) draws permeate through the membrane unit. The membrane permeate was passed through a 2-inch (51 mm) adsorption (activated carbon) column with an empty bed contact time of 13.5 min. The granular activated carbon was HydroDarco 3000 (Cabot Carbon) with a mesh size of 8×30 (falls through as screen with openings of US screen size 8 (2.4 mm) but remains on a screen with openings of US screen size 30 (0.6 mm)).

Raw water samples were collected immediately after mixing the NSF350 challenge water and kept refrigerated before transporting to an analytical lab. Membrane permeate and adsorption column effluent was collected in pre-labeled sampling bottles, and instantly refrigerated. Triplicate samples were taken from the membrane permeate and the adsorption column effluent.

The water quality results in Table 2 show that combination of ultra-filter (UF) membrane and carbon adsorption can meet NSF 350 requirements. The membrane alone can reduce turbidity and TSS to the required values for NSF 350. In addition, the membrane removes 53% of CBOD5, but this is not enough to reach the standard requirements. The addition of an adsorption column reduces CBOD5 to less than 5 mg/L as well as providing further reduction in turbidity.

TABLE 2

| Parameter | NSF effluent goal | NSF influent range | Challenge water | Permeate | Sorption effluent | Detection limit |
|---|---|---|---|---|---|---|
| Turbidity (NTU) | 5 | 30-70 | 71.45 | 1.65 | ≤0.5 | 0.5 |
| pH | 6 to 9 | — | 7.56 | 7.68 | 7.94 | NA |
| BOD | — | 100-180 | 117 | — | — | 5 |
| CBOD5 (mg/L) | 10 | — | 96 | 51 | ≤5 | 5 |
| TSS (mg/L) | 10 | 50-100 | 105 | ≤10 | ≤10 | 10 |

The results suggested that NSF 350 requirements for CBOD5, TSS and turbidity were met using a combination of ultrafiltration and activated carbon adsorption.

Synthetic NSF350 challenge water was prepared as per the requirements of NSF 350 (ANSI/NSF 2014). Table 1 shows the ingredients of the challenge water. This challenge water is suitable for testing systems treating bathing water only.

TABLE 1

| Ingredients | Amount/100 L |
|---|---|
| Body wash with moisturizer | 30 g |
| Toothpaste | 3 g |
| Deodorant | 2 g |
| Shampoo | 19 g |
| Conditioner | 21 g |
| Lactic acid | 3 g |
| Secondary effluent | 2 L |
| Bath cleaner | 10 g |
| Liquid hand soap | 23 g |
| Test dust | 10 g |

The challenge water was added to the collection tank. The treatment process included two steps: (1) membrane ultrafiltration and (2) carbon adsorption. The membrane unit

We claim:

1. A grey water treatment system comprising,
a collection tank;
a membrane unit in communication with the collection tank;
an activated carbon adsorption unit in communication with a permeate side of the membrane unit;
a permeate tank downstream of the activated carbon adsorption unit;
a grey water inlet in communication with the collection tank and adapted to be connected to a grey water drain of a single family residence; and,
a pre-filter unit upstream of the collection tank wherein the pre-filter unit comprises a filter screen, a bypass tank above the filter screen, the bypass tank having a lower end and an upper end, for retaining a volume of grey water above the filter screen to allow for more time for the grey water to pass through the filter screen, and an overflow extending from the upper end of the bypass tank to a waste outlet of the single family residence;
the filter screen in communication with and positioned below the lower end of the bypass tank; and the grey water inlet in communication with the filter screen and the lower end of the bypass tank and positioned therebetween;

a chlorination system configured to add chlorine to the collection tank and/or the permeate tank, and a proximity sensor proximate the overflow for indicating that influent grey water is near the upper end of the bypass tank;

wherein the total volume of the collection tank and the permeate tank is 500 L or less.

2. The system of claim 1 wherein the collection tank has a volume of 150 L or more.

3. The system of claim 2 further comprising a controller connected to pressure sensors in the collection tank and permeate tank, wherein the controller is configured to turn a membrane pump on and off.

4. The system of claim 1 wherein the permeate tank has a volume of 25 L or more.

5. The system of claim 4 wherein the permeate tank has a volume of 50 L or more.

6. The system of claim 1 wherein the chlorination system comprises a venturi located in line between a pressurized water delivery pump and the collection tank, the venturi being in communication with a chlorine tank.

7. The system of claim 1 further comprising a controller.

8. The system of claim 1 wherein the collection tank has a lower section with a smaller horizontal cross sectional area around the membrane unit relative to the horizontal cross sectional area of the collection tank above the membrane unit, and the membrane unit is located in the lower section and further wherein the collection tank has a volume of 150 L or more and wherein 20 L of water in the collection tank is sufficient to submerge the membrane unit.

9. The system of claim 1 having, a control system comprising one or more pressure sensors and a controller programmed to detect incoming grey water and calculate water level or volume in the collection tank based on a pressure signal; and, a purge pump in communication with the collection tank, wherein the controller is configured to turn the purge pump on and off to purge the collection tank and to determine a cumulative amount grey water collected in the collection tank since the last purge.

10. The system of claim 1 provided in a packaged unit no more than 2 feet wide and no more than 6 feet high.

* * * * *